United States Patent

Aizikowitz et al.

Patent Number: 5,946,491
Date of Patent: Aug. 31, 1999

[54] REGISTER ALLOCATION METHOD AND APPARATUS FOR GERNERATING SPILL CODE AS A FUNCTION OF REGISTER PRESSURE COMPARED TO DUAL THRESHOLDS

[75] Inventors: Nava Arela Aizikowitz; Liviu Asnash, both of Haifa; Roy Bar-Haim, Neve Monosson, all of Israel; Edward Curtis Prosser, Rochester, Minn.; Robert Ralph Roediger, Rochester, Minn.; William Jon Schmidt, Rochester, Minn.

[73] Assignee: International Business Machines Corporation, Armonk, N.Y.

[21] Appl. No.: 08/660,703

[22] Filed: Jun. 6, 1996

[51] Int. Cl.[6] .................................................. G06F 9/45
[52] U.S. Cl. ........................................... 395/709; 395/707
[58] Field of Search .................................. 395/705, 706, 395/707, 708, 709, 710

[56] References Cited

U.S. PATENT DOCUMENTS

| | | | |
|---|---|---|---|
| 4,571,678 | 2/1986 | Chaitin | 395/707 |
| 4,656,582 | 4/1987 | Chaitin et al. | 395/707 |
| 4,782,444 | 11/1988 | Munshi et al. | 395/709 |
| 5,249,295 | 9/1993 | Briggs et al. | 395/709 |
| 5,367,651 | 11/1994 | Smith et al. | 395/709 |
| 5,367,684 | 11/1994 | Smith | 395/709 |
| 5,418,958 | 5/1995 | Goebel | 395/709 |
| 5,530,866 | 6/1996 | Koblenz et al. | 395/708 |
| 5,659,754 | 8/1997 | Grove et al. | 395/709 |
| 5,828,886 | 10/1998 | Hayashi | 395/709 |
| 5,835,776 | 11/1998 | Tirumalai et al. | 395/709 |
| 5,867,711 | 2/1999 | Subramanian et al. | 395/709 |

OTHER PUBLICATIONS

Peter E. Bergner, Peter J. Dahl, and Matthew T. O'Keefe, *Spill Code Minimization Techniques for Graph Coloring Register Allocators,* University of Minnesota Manuscript, Department of Electrical Engineering, 1995.

Preston Briggs, *Register Allocation via Graph Coloring,* PhD Thesis, Rice University, 1992.

Preston Briggs, Keith D. Cooper, and Linda Torczon, *Coloring Register Pairs,* ACM Letters on Programming Languages and Systems ACM Press, vol. 1, No. 1, Mar. 1992, pp. 3–13.

David Callahan & Brian Koblenz, "*Register Allocation via Hierarchical Graph Coloring*", Proceedings of the ACM SIGPLAN '91 Conference on Programming Language Design and Implementation, SIGPLAN Notices, vol. 26, No. 6, pp. 192–203 (Jun. 1991).

Fred C. Chow & John L. Hennessy, "*The Priority–Based Coloring Approach to Register Allocation*", ACM Transaction on Programming Languages and Systems, vol. 12, No. 4, pp. 501–536 (Oct. 1990).

David Bernstein, Dina Goldin, Martin Golumbic, Hugo Krawczyk, Yishay Mansour, Itai Nahshon and Ron Pinter, *Spill Code Minimization Techniques for Optimizing Compilers,* ACM SIGPLAN Conference on Programming Languages Design and Implementation, 1989.

(List continued on next page.)

*Primary Examiner*—Zarni Maung
*Assistant Examiner*—Andrew Caldwell
*Attorney, Agent, or Firm*—Martin & Associates, L.L.C.; Derek P. Martin

[57] ABSTRACT

A method and apparatus for minimizing spill code in regions of low register pressure determines the register pressure at various locations in the computer program. When a live range is selected for spilling, spill code is generated to relieve the register pressure in regions of high register pressure, while spill code is avoided in regions of low register pressure. In this manner a minimum amount of spill code is generated, enhancing both the compile time and the run time of the resultant instruction stream.

7 Claims, 10 Drawing Sheets

OTHER PUBLICATIONS

Fred C. Chow & John L. Hennessy, "*Register Allocation by Priority–Based Coloring*", Proceedings of the ACM Symposium on Compiler Construction, pp. 222–232 (Jun. 1984).

Auslander & Hopkins, *An Overview of the PL. 8 Complier,* ACM SIGPLAN Notices, vol. 17, No. 6, Jun. 1982.

Gregory J. Chaitin, "*Register Allocation & Spilling via Graph Coloring*", Proceedings of the ACM Symposium on Compiler Construction, pp. 98–105 (Jun. 1982).

Gregory J. Chaitin, Marc A. Auslander, Ashok K. Chandra, John Cocke, Martin E. Hopkins and Peter W. Markstein, *Register Allocation via Coloring,* Computer Languages, 6:47–57, 1981.

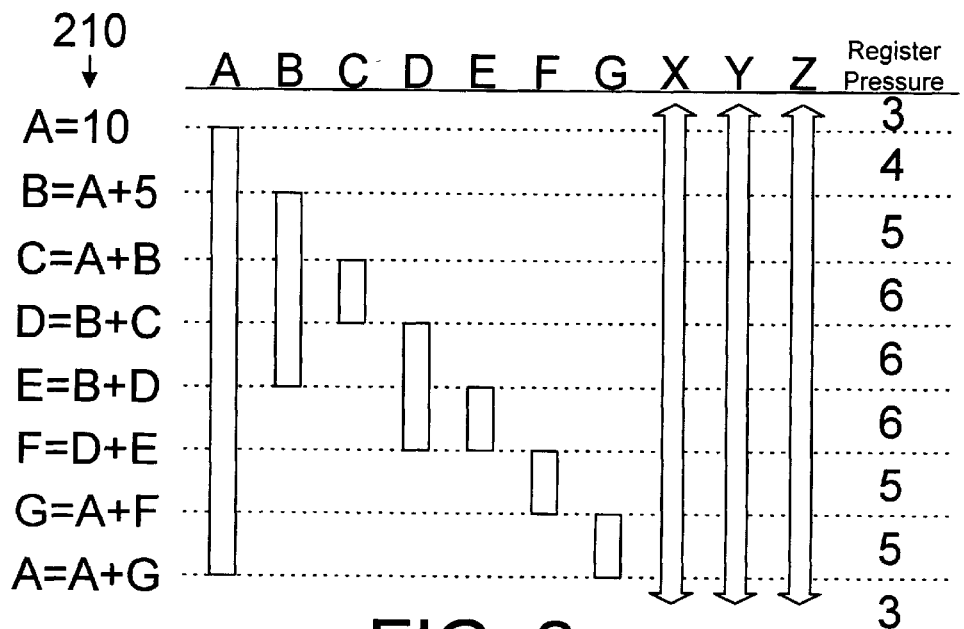
FIG. 2
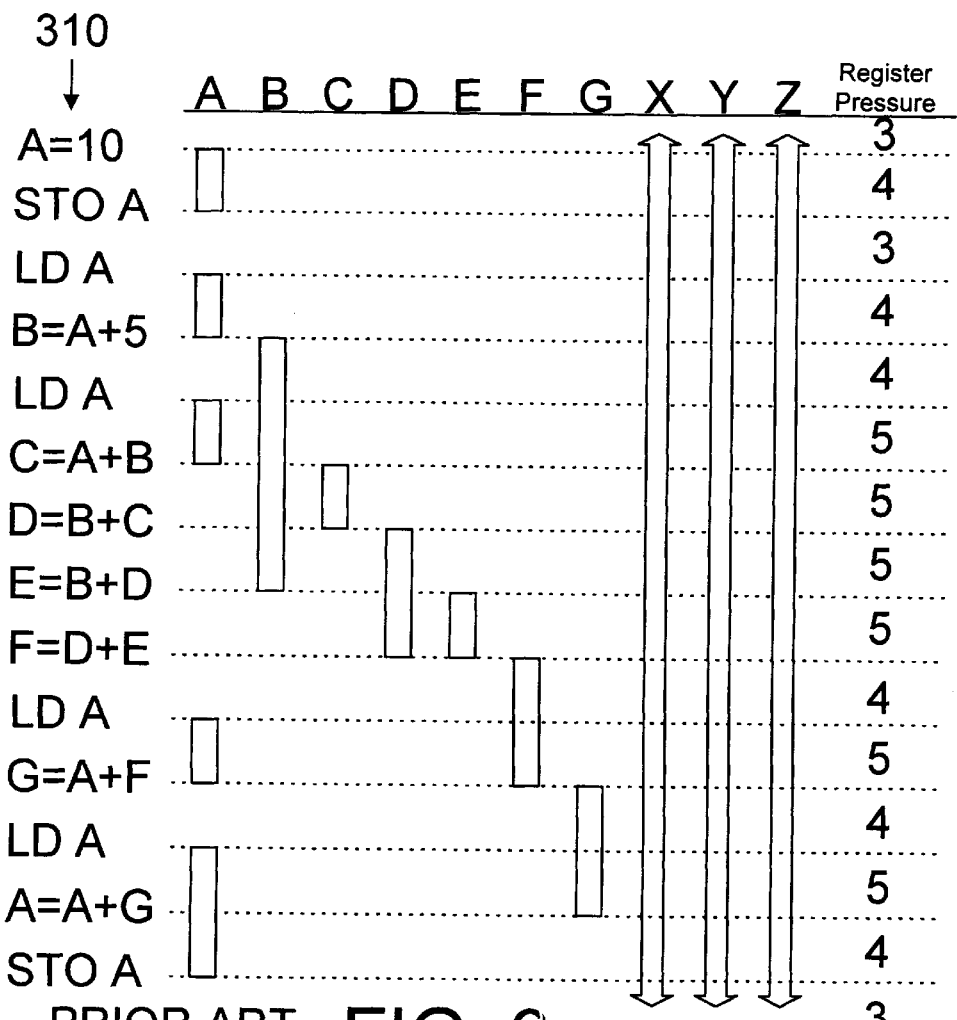
PRIOR ART  FIG. 3

REGISTER ALLOCATION METHOD AND APPARATUS FOR GERNERATING SPILL CODE AS A FUNCTION OF REGISTER PRESSURE COMPARED TO DUAL THRESHOLDS

RELATED APPLICATIONS

This patent application is related to the following co-pending patent applications: "Method and Apparatus for Improving Colorability of Constrained Nodes in an Interference Graph Within a Computer System", Ser. No. 08/509,637, filed Jul. 31, 1995; "Register Allocation Method and Apparatus for Truncating Runaway Lifetimes of Program Variables in a Computer System, Ser. No. 08/522,052, filed Aug. 31, 1995; and "Method and Apparatus for Using Partner Information to Color Nodes in an Interference Graph Within a Computer System", Ser. No. 08/562,139, filed Nov. 22, 1995.

FIELD OF THE INVENTION

This invention generally relates to computer systems. More specifically, this invention relates to a method and apparatus for efficiently allocating registers in a computer system to program variables in a computer program.

BACKGROUND OF THE INVENTION

The development of the EDVAC computer system of 1948 is often cited as the beginning of the computer era. Since that time, computer systems have evolved into extremely sophisticated devices. However, even today's most sophisticated computer systems continue to include many of the basic elements that were present in some of the first computer systems. One such element is the computer system's processor. A computer system's processor is the intelligent portion of the computer system. The processor is responsible for executing programs that interpret and manipulate information that is given to the computer system by the computer system's user or users.

As is well known, the processor operates on data contained within its registers with greater speed than operations on data stored external to the processor (i.e., in main memory). Designers of processors choose the number of processor registers which will allow the processor to perform well. The number of processor registers in a typical computer system is relatively small compared to the number of program variables in a typical computer program that the processor executes. Thus, the many program variables in a computer program must be allocated to specific processor registers for the processor to appropriately operate on the data.

Each of the program variables that are operated upon in a computer program must be assigned a corresponding processor register. Allocating the fixed number of processor registers to a much larger number of program variables in a computer program is generally referred to as register allocation. The performance of the computer system depends on how efficiently the processor uses its registers, which depends on the efficiency of the register allocation scheme. Therefore, register allocation is critical to the performance of the computer system. One common device that allocates program variables in the computer program to processor registers is commonly referred to as a compiler. Register allocation in a typical compiler uses the concept of "live ranges" or "lifetimes" of program variables. The "live range" or "lifetime" of a particular program variable is the span of instructions for which the variable contains valid data, and may be computed in a number of different ways.

One common method of allocating registers in a computer system constructs an interference graph of all live ranges in an instruction stream, then colors the graph with a number of colors corresponding to the number of processor registers. As discussed in the related applications cited above, there are many different schemes for coloring an interference graph. If a live range in the interference graph cannot be colored, it must be "spilled," meaning that the variable must be stored in memory rather than keeping its value in a register. Since the processor can only operate on data stored in registers, spilling a live range implies that the value must be loaded from memory into a register when it is needed, and stored back to memory when changed.

Spilling a live range requires the insertion of instructions into the instruction stream to perform the necessary stores to memory and loads from memory. These instructions are known as "spill code." The generation of spill code requires compiler time, and the presence of spill code in the instruction stream reduces the performance of the computer program. For these reasons, the generation of spill code must be done in an efficient manner to enhance the compile time of the instruction stream. In addition, the amount of spill code should be minimized to assure the best performance of the resultant machine code instruction stream.

Many known methods of generating spill code generate more spill code than is needed (reducing the performance of the resultant machine code instruction stream), or generate the spill code in an inefficient manner (increasing the compile time). Without methods and apparatus for improving the efficiency of spill code generation in compilers, excessive compile time and excessive spill code will continue to be an impediment to the overall performance of a computer system.

SUMMARY OF THE INVENTION

According to the present invention, a register allocation method and apparatus efficiently allocates the processor registers in a computer system to program variables in a computer program in a manner that minimizes spill code by accounting for the register pressure when making spill decisions and favoring regions of high register pressure for spilling, thereby avoiding the insertion of spill code in low register pressure regions. By creating spill code in high pressure regions and avoiding spill code in low pressure regions in accordance with the present invention, less spill code is introduced, resulting in more efficient allocation of registers and enhanced run-time performance of the computer program.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and:

FIG. 2 is an illustration of an example instruction stream illustrating the live ranges for symbolic registers in the instruction stream and the register pressure that results from interfering live ranges;

FIG. 3 is an illustration of an instruction stream that results from applying the Chaitin/Briggs spill everywhere approach to spilling symbolic register A in the instruction stream of FIG. 2;

DESCRIPTION OF THE PREFERRED EMBODIMENTS

OVERVIEW

Figure 1:
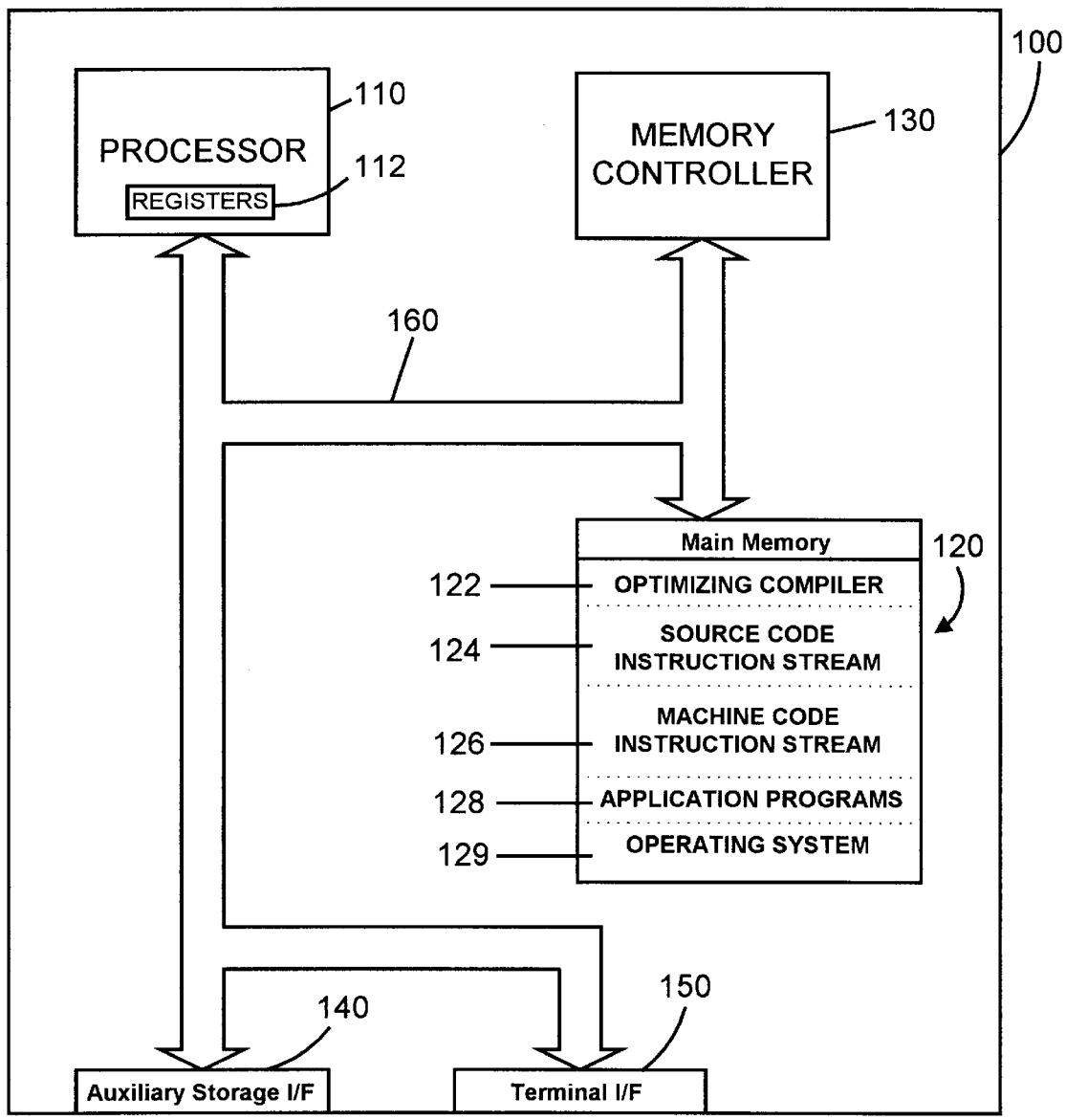
FIG. 1 is a schematic block diagram of a computer system in accordance with the present invention.

The method and apparatus of the present invention has particular applicability to the field of compilers, and specifically to the register allocation methods used in optimizing compilers. For those individuals who are not compiler experts, a brief overview of compilers and various register allocation mechanisms used in compilers is presented here.
Statements, Instructions, Compilers Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.
Physical Registers, Symbolic Registers, Lifetimes During the first pass or stage, one type of known compiler typically assumes that an unlimited number of physical registers are available for the target central processing unit (processor) to use. Thus, each time a program variable is encountered, it is assigned a new register in the intermediate language. However, in reality, the number of processor registers is fixed and is typically much smaller than the number of program variables in a typical computer program. Since the registers used in the intermediate language instruction stream have no correlation to physical processor registers, they are known as symbolic registers. During the second pass or stage, the optimizing compiler typically must allocate a large number of symbolic registers to a much smaller number of physical registers available to the processor. This process, known as register allocation, is the subject of the method and apparatus of the present invention.

As described in the Background of the Invention, register allocation in a compiler typically uses the concept of "live ranges" or "lifetimes". Both of these terms are used interchangeably in this specification. A "live range" for a variable, which may be a variable from the source program or a temporary variable generated by the compiler, is typically defined by a set of instructions for which the value contained in the symbolic register that represents the variable will be used in a subsequent computation. The live range for a variable begins when the variable is defined, and ends at the last use of the variable that occurs before any other definition of the variable. Note that the definition of live range used herein is simplified for purposes of illustrating the concepts of the present invention. For example, a live range may actually contain multiple definitions and last uses for a variable. Those skilled in the art are familiar with the concept of live ranges, and the simplified definition used herein shall not be construed as limiting the application of the present invention. In addition, the term symbolic register as used herein encompasses all forms of variables in various different instruction streams, including source code instruction stream 124, machine code instruction stream 126, or any other suitable form of instruction stream, including intermediate form instruction streams.
Register Allocation Mechanisms and Spill Code A common mechanism for allocating registers in optimizing compilers uses live ranges represented on an interference graph. Physical processor registers are then allocated to the live ranges using a graph coloring technique that is well known in the art. If all the live ranges of symbolic registers may be allocated to physical processor registers, the optimizing compiler produces a machine code instruction stream without spill code. If one or more of the symbolic registers cannot be allocated to a processor register, the live range must be "spilled", meaning that the live range is allocated to a memory location rather than to a register, and therefore must be loaded into a register from memory before use, and must be written back to memory after being changed. Loads and stores to memory take considerably longer than operations to registers, and minimizing the number of loads and stores to memory is thus a primary goal of an optimizing compiler in order to minimize the execution time of the machine code instruction stream. If the live range is spilled, spill code (i.e., memory loads and stores) must be added to the intermediate language instruction stream to accomplish the required accesses to memory. The loading and storing of spilled live ranges adds overhead to the machine code instruction stream, slowing its execution time, and slows compilation time due to the extra processing to make decisions concerning the insertion of spill code. Therefore, an optimizing compiler typically has a goal of efficiently allocating processor registers to the highest number of symbolic registers possible while minimizing spill code in order to minimize both the compile-time and run-time overhead associated with spill code.

Spill Code Generation in Known Register Allocation Mechanisms for Compilers

A well-known mechanism for allocating registers in an optimizing compiler was developed by Gregory J. Chaitin of IBM, as disclosed in U.S. Pat. No. 4,571,678 *"Register Allocation and Spilling Via Graph Coloring "*(issued Feb. 18, 1986 to Chaitin and assigned to IBM); Gregory J. Chaitin et al., *"Register Allocation Via Coloring"*, Computer Languages, Vol. 6, p. 47–57 (1981); and Gregory J. Chaitin, *"Register Allocation & Spilling Via Graph Coloring"*, SIGPLAN '82 Symposium on Compiler Construction, SIGPLAN Notices, Vol. 17, No. 6, p. 98–105 (June 1982). An improvement to the Chaitin register allocation scheme was proposed by Preston Briggs et al. in *"Coloring Heuristics for Register Allocation"*, Proceedings of the SIGPLAN '89 Conference on Programming Language Design and Implementation, ACM Press, Vol. 24, No. 7, pp. 275–284 (July 1989). While the register allocation method of Chaitin differs from the Briggs approach, both use similar techniques to generate spill code for a node to be spilled.

Chaitin/Briggs typically operate on an intermediate language instruction stream, i.e., the instruction stream that results from the first pass or stage of an optimizing compiler. An exemplary instruction stream 210 is shown in FIG. 2. To illustrate the concepts of the present invention, instruction stream 210 is a simplified representation of an intermediate language instruction stream. In addition, while instruction stream 210 shown in FIG. 2 may appear to be straight-line code such as that found within a basic block, in reality instruction stream 210 may bridge many basic blocks. Instruction stream 210 represents the relevant instructions within the instruction stream, no matter where they are located and regardless of the number of intervening (and thus unshown) instructions. Instruction stream 210 is shown for purposes of illustration and simplifying the discussion of the present invention, and one skilled in the art will appreciate that the description herein with respect to instruction stream 210 is not limited by any particular format or configuration of the instruction stream used.

Referring to FIG. 2, the live ranges for each of the symbolic registers in instruction stream 210 are shown by the bars to the right of the instruction stream. Overlapping live ranges represent interferences between live ranges. Note that some live ranges (e.g., X, Y and Z of FIG. 2) may span the entire instruction stream 210. To the far right of FIG. 2 is a column indicating register pressure for each statement or instruction in instruction stream 210.

If symbolic register A is selected for spilling, the Chaitin/Briggs approach for generating spill code inserts a store instruction after every definition of the symbolic register, and inserts a load instruction before every use of the symbolic register. This is known as a "spill everywhere" approach, meaning that spill code is inserted for each definition and use of the symbolic register. Referring to FIG. 3, the instruction stream 310 that results from applying the Chaitin/Briggs spill everywhere approach includes load and store instructions that break up the live range of A into many smaller live ranges. Note that this spill approach succeeds in reducing the maximum register pressure (discussed in more detail below) from 6 (FIG. 2) to 5 (FIG. 3), but does so at the cost of unnecessary spill code in low pressure regions. The Chaitin/Briggs approach to generating spill code takes more compile time than is needed, and creates unnecessary instructions in the resultant instruction stream, thereby inhibiting its performance.

A known method for improving the Chaitin/Briggs spill everywhere approach is known as "local cleaning." Local cleaning is similar to the spill everywhere approach, except a load instruction will not be inserted if there is already another redundant load instruction earlier in the same basic block within a given number of instructions. Local cleaning thus succeeds at eliminating some of the load instructions that the spill everywhere approach would insert, but does so based on a somewhat arbitrary number of instructions separating load instructions.

Another known method for improving the spill everywhere approach only inserts one load per basic block. This "once per basic block" strategy inserts a load instruction for only the first upwardly exposed use in each basic block. As a result, a portion of a live range that occurs after a first upwardly exposed use within a basic block will not be spilled, regardless of the benefit that may result from spilling these subsequent uses.

Still another method for improving the Chaitin/Briggs spill everywhere approach was proposed by Peter Bergner in *"Spill Code Minimization Techniques for Graph Coloring Register Allocators"*, University of Minnesota Manuscript, Department of Electrical Engineering, 1995. Bergner proposes an improved spill technique that he dubs "arc spilling." However, while Bergner's approach does generate less spill code than the Chaitin/Briggs spill everywhere approach, it does not directly take measurements of register pressure into account when generating spill code. Register pressure is a useful measure of constraints that affect register allocation, as discussed below.

Register Pressure

A useful measure of the total number of registers needed at any given point in a computer program is known as "register pressure." If the register pressure exceeds the total number of available registers at any given point, one or more of the live ranges that contribute to the register pressure at that point must be spilled to reduce the register pressure to a level less than or equal to the total number of available registers. The Chaitin/Briggs spill everywhere approach generates spill code (i.e., memory loads and stores) for every definition and use of the symbolic register. By spilling everywhere, the single live range is split into a number of smaller live ranges, and the register pressure between the smaller live ranges is reduced. Note, however, that a feature of the Chaitin/Briggs spill everywhere approach is that unneeded spill code is generated in regions where the register pressure is low, i.e., where there are sufficient registers to service the register needs in the code. While spilling everywhere certainly eliminates the interference in the region of high pressure that was desired, it does so at the expense of generating unnecessary spill code in low pressure regions.

Mechanisms of the Present Invention

The register allocation apparatus and method in accordance with the present invention overcomes the disadvantage of spill code generation using known register allocation techniques by favoring the generation of spill code in high pressure regions, while avoiding the generation of spill code in low pressure regions.

DETAILED DESCRIPTION

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

Processor 110 performs computation and control functions of computer system 100, and comprises a suitable central processing unit with several internal registers 112. The registers 112 within processor 110 correspond to the "physical registers" discussed in the Overview section above. Processor 110 may comprise a single integrated circuit, such as a microprocessor, or may comprise any suitable number of integrated circuit devices and/or circuit boards working in cooperation to accomplish the functions of a central processing unit. Processor 110 suitably executes a machine code instruction stream 126 within main memory 120, and in response thereto acts upon information stored in physical registers 112.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple main processors and multiple system buses. Similarly, although the system bus 160 of the preferred embodiment is a typical hardwired, multidrop bus, any connection means that supports bi-directional communication could be used.

Figure 7:
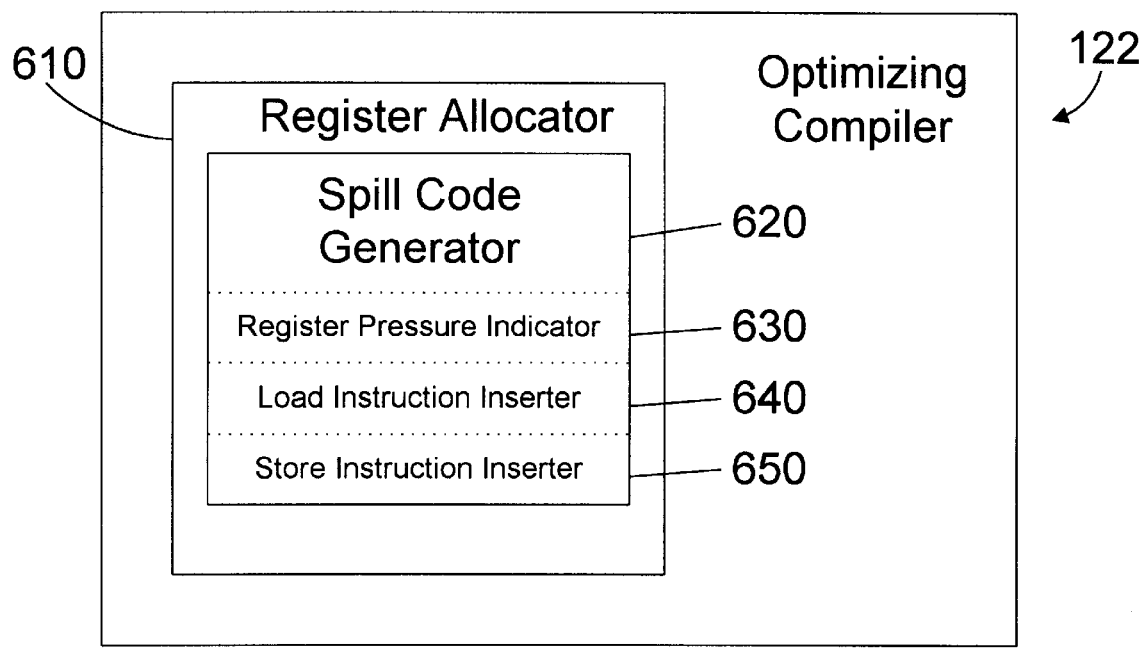
FIG. 7 is a block diagram view of the optimizing compiler of FIG. 1.

Main memory 120 contains an optimizing compiler 122, a source code instruction stream 124, a machine code instruction stream 126, application programs 128, and an operating system 129. Referring to FIG. 7, within compiler 122 is a register allocator 610 that allocates physical registers 112 within processor 110 to instructions in machine code instruction stream 126 in accordance with the present invention. Register allocator 610 includes a spill code generator 620, which includes a register pressure indicator 630, a load instruction inserter 640, and a store instruction inserter 650. Register pressure indicator 630 determines the register pressure at specific regions in the computer program. Load instruction inserter 640 and store instruction inserter 650 insert memory load instructions and memory store instructions, respectively, at locations determined by the register pressure within the computer program.

It should be understood that main memory 120 will not necessarily contain all parts of all mechanisms shown. For example, portions of application programs 128 and operating system 129 may be loaded into an instruction cache (not shown) for processor 110 to execute, while other files may well be stored on magnetic or optical disk storage devices (not shown). In addition, compiler 122 may generate a machine code instruction stream 126 that is intended to be executed on a different computer system if compiler 122 is a cross-compiler.

The remainder of this specification describes how the present invention improves the allocation of physical registers 112 to instructions in machine code instruction stream 126 compared to known prior art methods. Those skilled in the art will appreciate that the present invention applies equally to any compiler or any instruction stream that may be optimized by representing the relationship between registers as live ranges or lifetimes.

Figure 4:
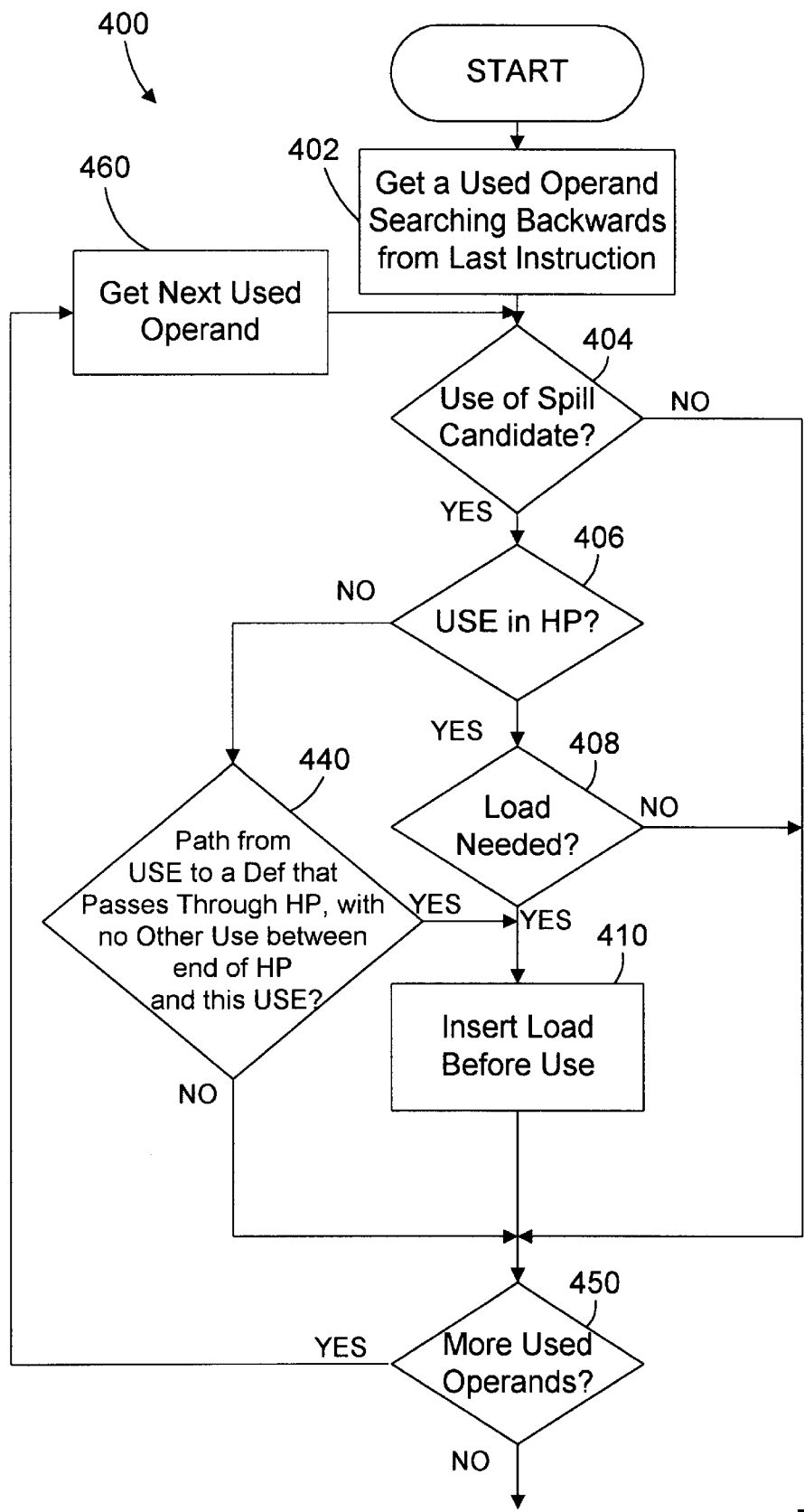
FIG. 4 is a flow diagram of a use scan portion of a suitable spill code generation method in accordance with a first embodiment of the present invention.
Figure 5:
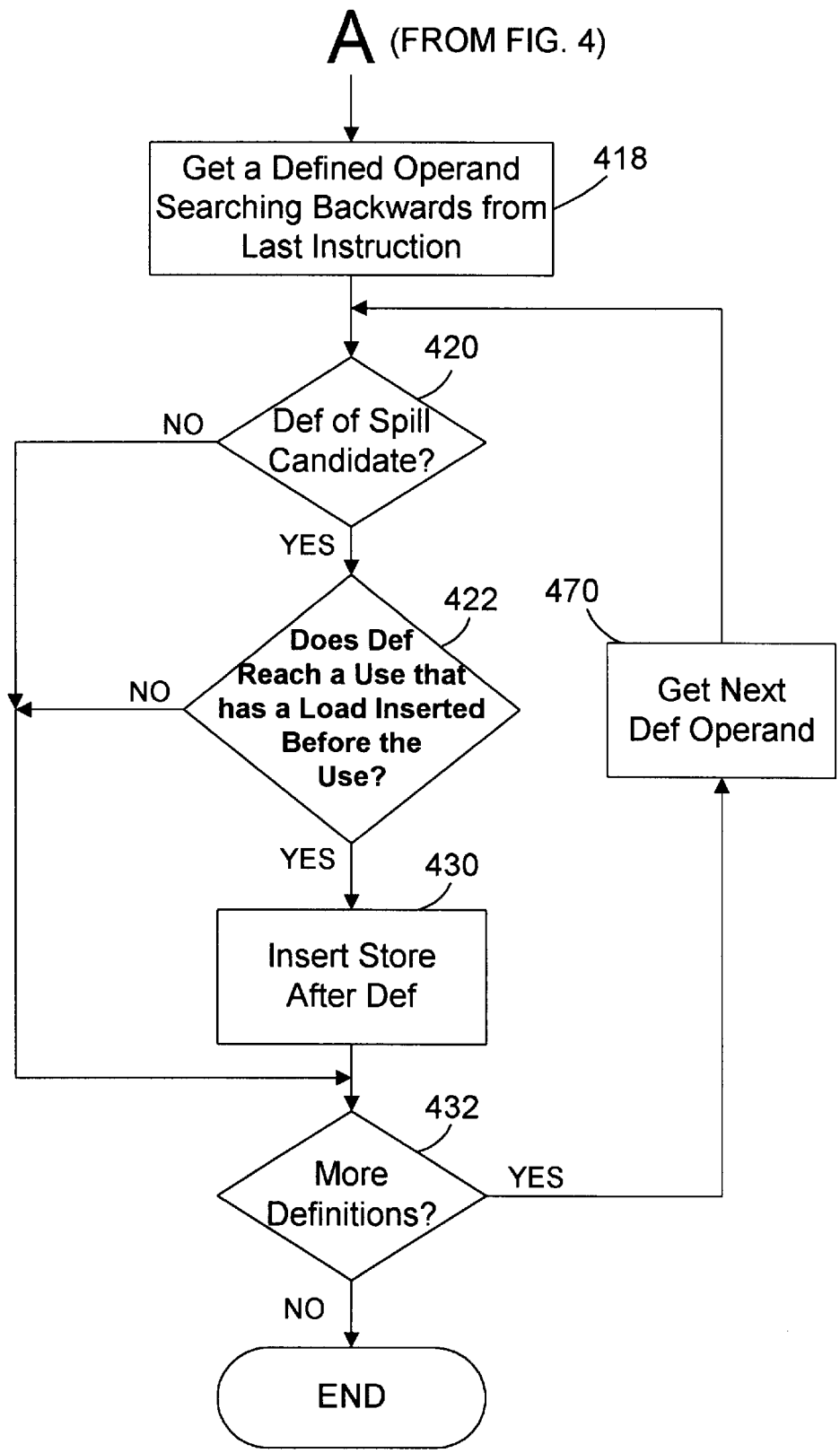
FIG. 5 is a flow diagram of the def scan portion of the spill code generation method of FIG. 4.
Figure 6:
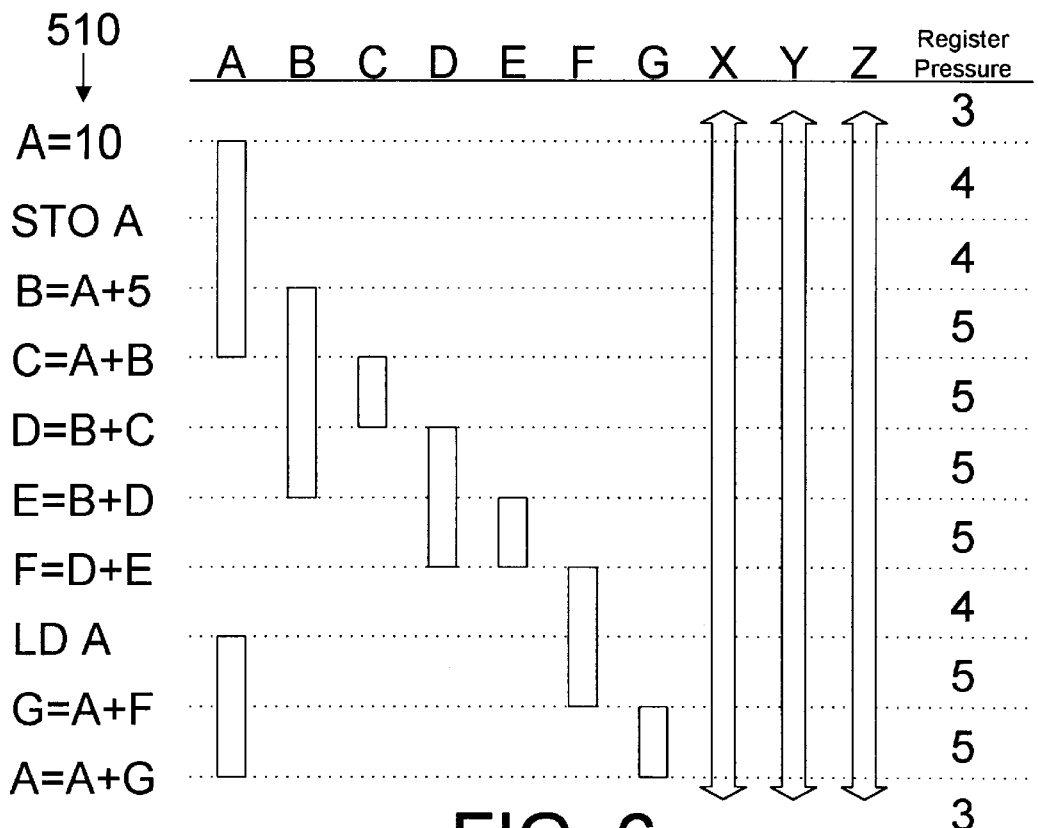
FIG. 6 is an illustration of an instruction stream that results from applying the spill code generation method of FIG. 4 to the instruction stream of FIG. 2.

Referring to FIGS. 4 and 5, a method 400 for generating spill code in accordance with the present invention analyzes each use and definition of a symbolic register in an instruction stream. Register pressure is computed for each instruction, with each instruction denoted as either "high pressure" (HP) or "low pressure" (LP). In general, the insertion of spill code (i.e., memory loads and stores) depends on the register pressure at each use of a symbolic register, at definitions that reach that use, and in between. The method of the present invention inserts spill code in accordance with the present invention by gathering all the required information to spill all the needed registers during one or more "passes" through the intermediate code instruction stream, preferably in reverse order (i.e., starting from the last instruction and processing in reverse sequence through the first instruction). For each basic block, the register pressure is initialized to the number of registers that are live on exit from that block. A symbolic register is "live on exit" from a basic block if there is a possible execution path to a use from the end of the block along which there is no intervening definition. A symbolic register is "live on entry" to a basic block if there is a possible execution path to a use from the beginning of the block along which there is no intervening definition. As each instruction is processed from last to first, the number of unique defined registers corresponding to the instruction are subtracted from the pressure count, and the number of unique used registers are added. During this scan, data is accumulated so that appropriate loads and stores may be inserted to relieve the register pressure in high pressure regions while minimizing spill code in low pressure regions. In this manner the register pressure may be calculated for each instruction in the intermediate code instruction stream, as illustrated in FIGS. 2, 3 and 6. In an alternative embodiment, register pressure may be determined for regions or groups of instructions, such as basic blocks, with the register pressure representing the highest register pressure present in the group of instructions.

Referring to FIGS. 4 and 5, method 400 in accordance with the preferred embodiment makes two passes, the first pass (FIG. 4) analyzing uses and inserting appropriate load instructions, and the second pass (FIG. 5) analyzing defs that reach the uses (including the inserted load instructions). For greatest efficiency, the preferred embodiment generates spill code for all spill candidates (i.e. symbolic registers of interest) simultaneously during each pass. However, it is equally within the scope of the present invention to generate spill code (or calculate spill costs) for any subset of the spill candidates, including a single spill candidate. Method 400 starts by getting a used operand by searching backwards from the last instruction (step 402). Method 400 determines if the instruction contains a use of any of the spill candidates (step 404). If the operand is not a use of a spill candidate (step 404=NO), no action is taken, and method 400 gets the next used operand (step 460) if the analysis is not complete (step 450=YES).

If the selected operand is a use of a spill candidate (step 404=YES) and the use is in a high pressure region (step 406=YES), method 400 will determine whether a load is needed (step 408) using any suitable heuristic, such as the Chaitin/Briggs spill everywhere approach, the local cleaning approach, the once per basic block approach, or any other suitable approach. For purposes of illustration, we assume a spill everywhere approach for step 408. If the selected approach would determine that a load is needed (step 408=YES) before the use, a load is inserted before the use (step 410). Method 400 then determines whether all the used operands have been analyzed (step 450), and if not (step 450=YES), selects the next used operand (step 460) and repeats the analysis.

If the selected operand has a use of a spill candidate (step 404=YES), and the use is in a low pressure region (step 406=NO), method 400 determines whether there exists a path from the use to a reaching def statement that passes through a high pressure region, with no other use between the end of the high pressure region and the use (step 440). If so (step 440=YES), a load is inserted before the use (step 410). If not (step 440=NO), no load is inserted, and method 400 proceeds to the next used operand (if any). Once all used operands have been analyzed in the first scan (step 450=NO), method 400 proceeds to the second scan (FIG. 5) to analyze the operand definitions in the instruction stream.

The first step is to get a defined operand by searching backwards from the last instruction (step 418). If the selected operand is a def of a spill candidate (step 420=YES), method 400 then determines whether the def statement reaches a use that has a load instruction inserted before it (step 422). If so (step 422=YES), a store instruction is inserted after the def statement (step 430). If not (step 422=NO), no store instruction is inserted, and method 400 determines if there are more definitions to analyze (step 432). If all definitions have been analyzed (step 432=NO), method 400 is done. If more definitions remain to be processed (step 432=YES), method 400 gets the next defined operand (step 470), and the process continues until all defined operands in the instruction stream have been analyzed.

The implementation of method 400 may be illustrated using the instruction stream 210 of FIG. 2, with the resultant instruction stream 510 including spill code as shown in FIG. 6. For this specific example, we assume that the register pressure threshold for high pressure is 5, and that a register pressure of 5 or less denotes a low pressure region, while a register pressure of greater than 5 denotes a high pressure region. This means that the instructions that have a register pressure of 6, namely D=B+C and E=B+D, are instructions in a high pressure region, while the rest are instructions in low pressure regions. Assume that symbolic register A is selected for spilling (i.e., A is a spill candidate). If the instructions are analyzed from the bottom up, the last instruction contains a use of A (step 404=YES), and this use is in low pressure (step 406=NO). Method 400 then determines if there is a path from this use to a reaching definition that passes through a high pressure region, with no other use between the end of the high pressure region and this use (step 440). For instruction stream 210, the first instruction (i.e., A=10) is a definition that reaches the use, and there is a high pressure region between this use and the def, but there is an instruction G=A+F that comes between this use and the end of the high pressure region. Thus, the answer to step 440 is NO, and no load is inserted for this instruction.

The next used operand is selected (step 460), which is the use of G in the same instruction. Assuming A is the only spill candidate, the use of G is not a use of a spill candidate (step 404=NO), and because there are more used operands to analyze (step 450=YES), the next used operand is selected (step 460). As shown by this use of G, if a use operand is not a spill candidate, no action is required. For this reason, the remainder of the discussion herein will focus on uses and defs of the one spill candidate, register A.

The next used operand (of A) is then selected (step 460), which is the use of A in instruction G=A+F. This is a use of spill candidate A (step 404=YES), and the use is in a low pressure region (step 406=NO). There is a path from this use to a def that passes through a high pressure region with no intervening uses between the end of the high pressure region and this use (step 440=YES), so a load is inserted before the use (step 410).

The next relevant operand that is selected is the use of A in the instruction C=A+B (step 460). This is a use of spill candidate A (step 404=YES), and is in low pressure (step 406=NO). The path between this use and the reaching def (A=10) does not have a high pressure region between the two, so the answer to step 440 is NO and no load is inserted for this use. Next, the use of A in the instruction B=A+5 is selected (step 460). This is a use (step 404=YES) in low pressure (step 406=NO), and there is no high pressure path between this use and its reaching def A=10, so the answer to step 440 is NO and no load is inserted for this use. This is the last used operand of spill candidate A (step 450=NO), so the first scan is complete. The second scan (FIG. 5) then analyzes the operand definitions within the instruction stream.

Again performing the scan from the last instruction to the first, the first def that is selected is the def of A in the last instruction (step 418). This operand is a def of spill candidate A (step 420=YES). Method 400 then determines whether any use reached by this def has a load inserted before it (step 422). For this specific example of FIG. 2, we assume that there is no subsequent use of A after the instruction stream shown, so the answer to 422 is NO and no store is inserted for this instruction. There are still more definitions to process (step 432=YES), so method 400 gets the next def operand (step 470). For the example of FIG. 2, the next def operand is the def of G in the instruction G=A+F. Because A is the only spill candidate, this def of G is not a def of a spill candidate (step 420=NO). Since more definitions remain to be analyzed (step 432=YES), the next def operand is selected (step 470), and the process is repeated. As with the use scan of FIG. 4, the remainder of this description will focus on definitions of spill candidate A, recognizing that all other def operands will have no effect on the insertion of spill code.

The next relevant def (of A) is then selected (step 470). This is a def of spill candidate A (step 420=YES) in the instruction A=10. Method 400 then determines whether any use reached by this def has a load inserted before it (step 422). At this point in time a load instruction has been inserted before the instruction G=A+F, and this def does reach the use in that instruction, so the answer to step 422 is YES, and a store instruction is inserted after the def. At this point the last def operand has been analyzed, so method 400 is done (step 432=NO).

The resultant instruction stream after generating spill code in accordance with the present invention is shown in FIG. 6. Comparing the instruction stream that results from the apparatus and method of the present invention (FIG. 6) with the instruction stream that results from the Chaitin/Briggs spill everywhere approach (FIG. 3) reveals some significant differences. First, the register pressure was reduced in the high pressure regions in both cases. But note that no unnecessary spill code was generated in regions of low register pressure for the spill code generation method 400 of the present invention (FIG. 6). Rather than divide the live range for A into five different portions, which required four load and two store instructions (FIG. 3), the present invention has succeeded in achieving the same reduction in register pressure with only one load instruction and one store instruction. As a result, the resultant instruction stream will execute much more efficiently due to the reduction in spill code. In addition, the smaller interference graph that results from less spill code also reduces compile time when the graph is recolored to account for interferences introduced by the spill code.

The specific definition of "high pressure" and "low pressure" may vary within the scope of the present invention according to the specific details of the implementation. In the preferred embodiment, the register pressure is defined as high pressure if it exceeds a predetermined upper threshold, and low pressure if it is less than a predetermined lower threshold. The two different threshold values allow the method to build in hysteresis into the definition of low pressure and high pressure on an instruction-by-instruction basis to avoid excessive changes from low to high pressure (and vice versa) at the boundary between high pressure and low pressure. For example, if the upper threshold were set to eight and the lower threshold were set to six, instructions with a register pressure of zero to five would be low pressure instructions, instructions with a register pressure of nine and up would be high pressure instructions, and instructions with a register pressure of six, seven or eight may be low or high pressure, depending on the pressure of the surrounding instructions. To provide a desirable hysteresis, register pressure in the range from six to eight would not cause a change in register pressure, whether it be high or low.

In one specific implementation of the preferred embodiment, the upper threshold and lower threshold are the same, and the register pressure is measured for each instruction, so each instruction will be in either a high pressure or a low pressure region, depending on the register pressure for the particular instruction. One suitable threshold level for determining high pressure regions is the number of physical processor registers 112 that processor 110 has available for its use.

Method 400 may be invoked once a live range (i.e., symbolic register) has been selected for spilling. Note, however, that one skilled in the art could use method 400 to compute spill costs of various different spill candidates rather than, or in addition to, the insertion of spill code. Instead of inserting load and store instructions as shown in FIGS. 4 and 5, method 400 could instead simply increase the spill cost by the cost of the load or store that would be required for the spill candidate based on register pressure. The nodes with the lowest spill cost would then be selected for spilling. The calculation of spill cost for spill candidates is within the scope of the method of the present invention.

Method 400 as described above generally describes the method of the present invention in the context of a simplified instruction stream 210 to illustrate the concepts of the present invention. The simplified instruction stream 210, while illustrative of a local spill strategy, does not allow illustration of how the spill decisions are handled when multiple definitions reach a use of a register to be spilled. Since multiple definitions may reach a single use, store instructions may be required for each def statement that reaches the use. This type of instruction stream 750 is illustrated by the basic blocks in the flow diagram of FIG. 8. Blocks A–G represent basic blocks within an intermediate code instruction stream. Symbolic register X is a spill candidate of interest. Definitions of symbolic register X are shown by the instructions "X=", while uses are shown by the instructions "=X". Thus, instructions 712, 714 and 718 are def statements for X, while instructions 700, 702, 704, 706, 708, 710, and 716 are all use statements for X. Low pressure regions are not shaded, while high pressure regions are shaded. The spill code inserted into instruction stream 750 will now be illustrated with reference to FIGS. 4, 5 and 8–12.

Figure 8:
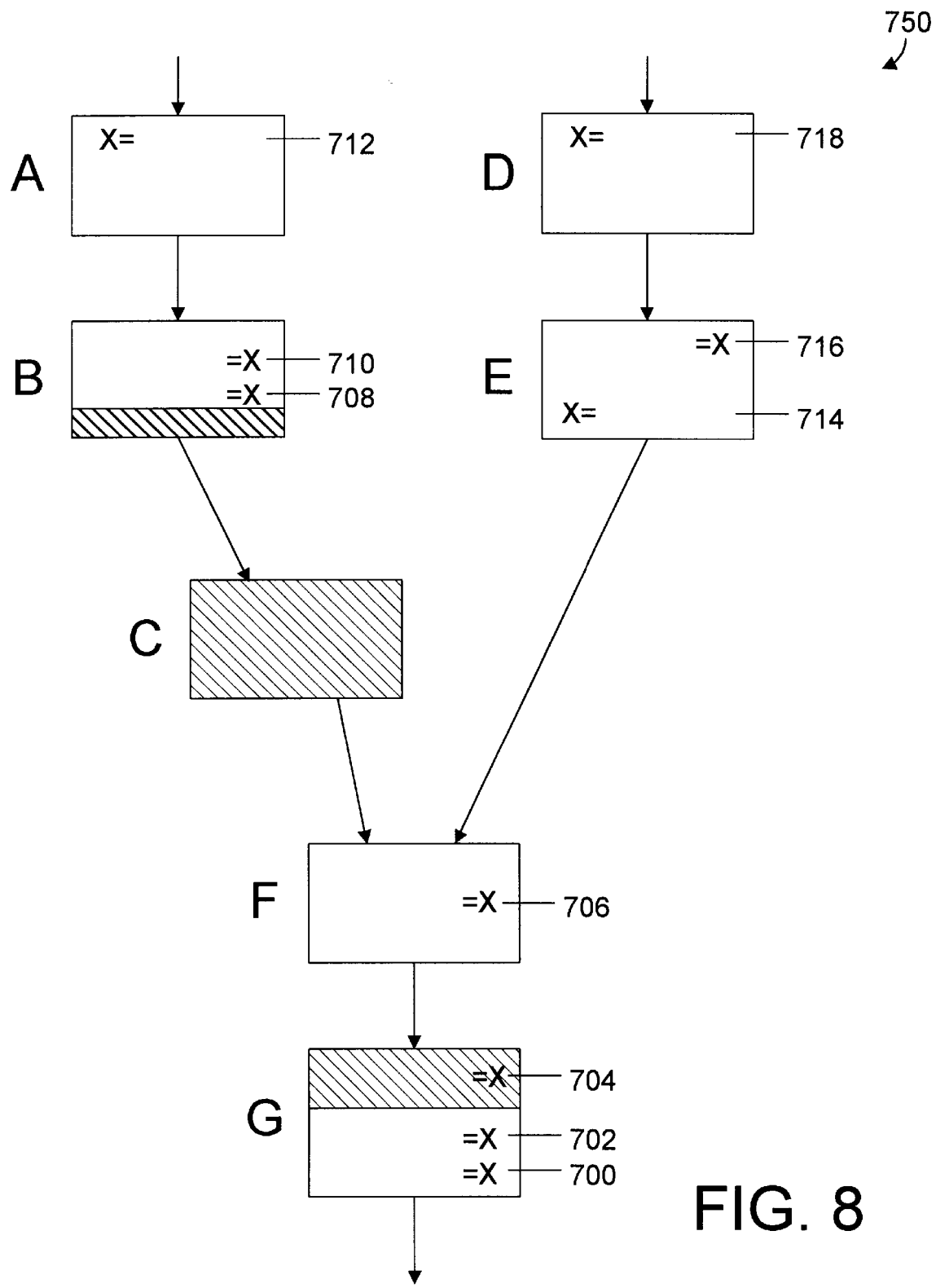
FIG. 8 is an example program flow diagram for illustrating the spill code generation method in accordance with the present invention.
Figure 9:
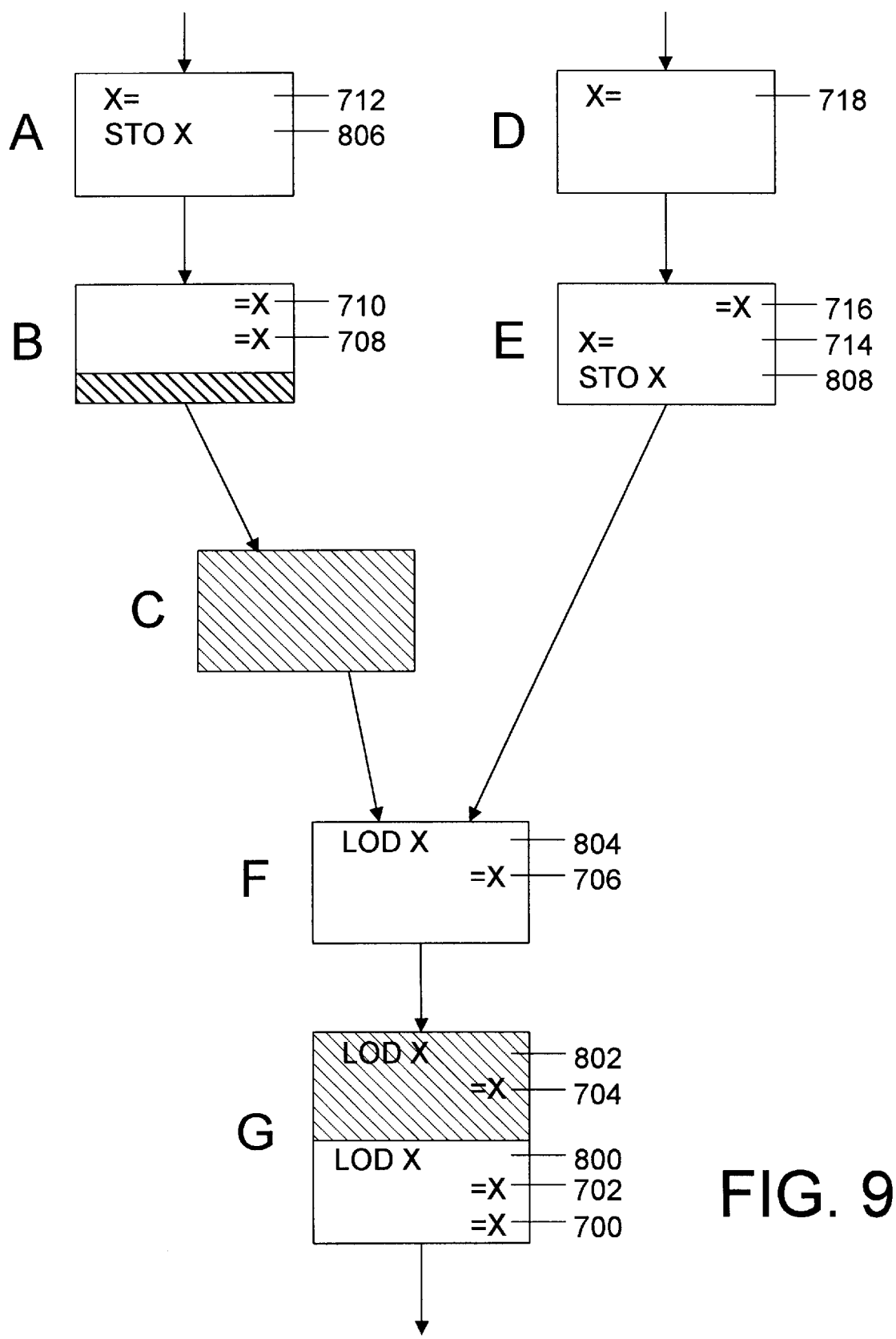
FIG. 9 is the program flow diagram that results from performing the spill code generation method of FIG. 4 on the flow diagram of FIG. 8.

Method 400, when applied to instruction stream 750 of FIG. 8, results in the dataflow diagram of FIG. 9. The last instruction 700 is considered first, which contains a used operand (step 402=YES). This used operand is a use of spill candidate X (step 404=YES), and is in low pressure (i.e., not shaded) (step 406=NO), so method 400 must determine whether there exists a path from the use in instruction 700 to a def that passes through a high pressure region, with no other use between the end of the high pressure region and the use candidate (step 440). There is a path from the use in instruction 700 to a def in instruction 712 that passes through a high pressure region (a portion of block G, along with block C and a portion of block B). However, there is another use, statement 702, between the use at instruction 700 and the def at instruction 712, (step 440=NO), so no load is inserted for the use in instruction 700.

The next used operand is in instruction 702 (step 460), which is a use of spill candidate X (step 404=YES), and is in low pressure (step 406=NO). However, for instruction 702 there is no intervening use between it and the high pressure region in block G, so the answer to step 440 is YES, and a load (instruction 800) is inserted (step 410) before the use at instruction 702.

Next, the used operand in instruction 704 is selected (step 460). This is a use of spill candidate X (step 404=YES) and is in high pressure (step 406=YES). With the assumption that method 400 defaults to a spill everywhere approach for step 408, a load is needed (step 408=YES), so a load (instruction 802) is inserted (step 410) before the use in instruction 704.

The used operand in instruction 706 is analyzed next (step 460). This is a use of spill candidate X (step 404=YES) and is in low pressure (step 406=NO). There is a path to a def at instruction 712 in block A through a high pressure region, and there are no intervening uses, so the answer to step 440 is YES and a load (instruction 804) is inserted (step 410) before the use.

We now reach a branch in instruction stream 750, and arbitrarily choose to proceed by scanning the instructions in the left branch. Thus, instruction 708 is analyzed next (step 460). This is a use of spill candidate X (step 404=YES) and is in low pressure (step 406=NO), but there is no path between the def at instruction 712 and the use at instruction 708 that passes through a high pressure region, so the answer to step 440 is NO, and no load is inserted. The used operand of instruction 710 is analyzed next (step 460). Instruction 710 follows the same path through the flowchart of FIG. 4 as instruction 708, so no load is inserted due to instruction 710. This is the last instruction in the left branch of instruction stream 750 that contains a used operand, so the right branch is now traversed from its last instruction.

The next used operand is in instruction 716 (step 460). This instruction has a use of spill candidate X (step 404=YES) which is in low pressure (step 406=NO). There is no high pressure region between the use at instruction 716 and its reaching definition at instruction 718, so the answer to step 440 is NO, and no load is inserted for instruction 716. At this point there are no more used operands in the instruction stream (step 450=NO), so method 400 proceeds to its second pass (FIG. 5).

Beginning with the last instruction and scanning up, there are no defined operands in blocks G and F. Assuming that we arbitrarily choose the left branch, as we scan up, the first defined operand is in instruction 712 (step 418). This is a def of spill candidate X (step 420=YES). Next, method 400 determines whether the def in instruction 712 reaches a use that has a load inserted before the use (step 422). In this example, the def in instruction 712 reaches instructions 706, 704 and 702, all of which have loads inserted before their uses (FIG. 9). As a result, the answer to step 422 is YES, and a store (instruction 806) is inserted (step 430) after the def.

Since there are more defined operands (step 432=YES), the next defined operand is selected. In this example, there are no more defs in the left branch, so the right branch is traversed. The next defined operand is in instruction 714 (step 470). This is a def of spill candidate X (step 420=YES). This def reaches the same uses of X in blocks F and G as instruction 712, so the answer to step 422 is YES and a store (instruction 808) is inserted (step 430) after the def at instruction 714. Next, instruction 718 is analyzed. This is a def of spill candidate X (step 420=YES). This definition in instruction 718 reaches the use in instruction 716, but does not reach any of the uses in blocks F and G due to the redefinition at instruction 714. As a result, the answer to step 422 is NO, and no store is inserted for instruction 718. At this point there are no more defined operands in the instruction stream (step 432=NO), so method 400 has completed generating spill code in accordance with the present invention, with a resultant instruction stream as shown in FIG. 9.

Method 400 will require keeping track of a lot of data during the dataflow analysis to be able to answer the questions in steps 422 and 440. One alternative which eases the burden of implementing the method in accordance with the present invention makes spill decisions based primarily on information within a basic block or other partitioning of instructions. This is possible by determining whether a symbolic register is "live on exit" or "live on entry" to a basic block (as described above), and making spill decisions accordingly.

Figure 10:
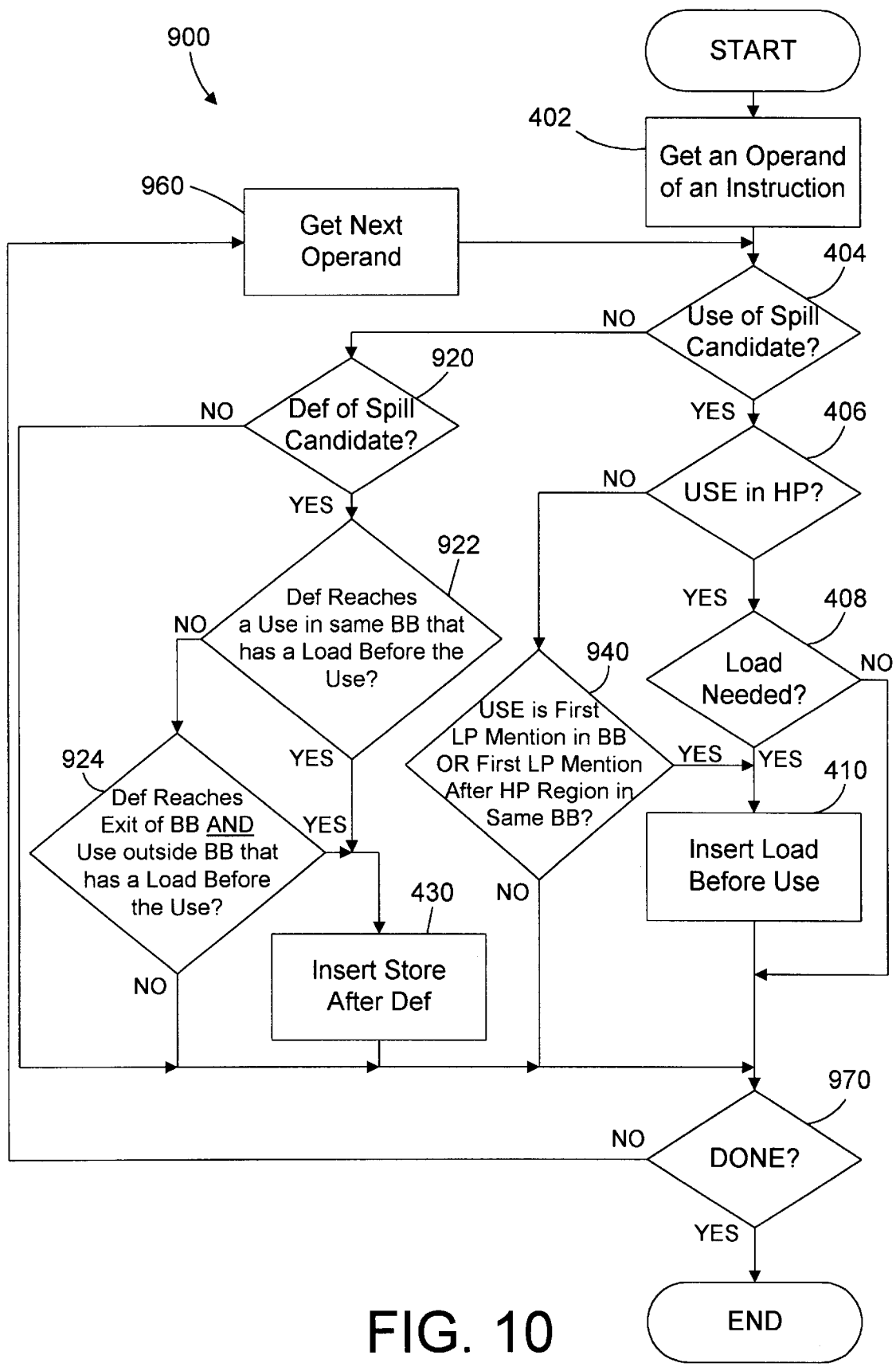
FIG. 10 is a flow diagram of a suitable spill code generation method in accordance with a second embodiment of the present invention.

Referring to FIG. 10, a method 900 in accordance with a second embodiment of the present invention makes spill decisions based primarily on information within each basic block. Most of the steps of method 900 are the same as shown for method 400 of FIGS. 4 and 5, but method 900 can process both uses and defs of spill candidates in a single pass. Beginning with instruction 700 of FIG. 8, this instruction has a single operand X (step 402), which is a use of spill candidate X (step 404=YES). The use is in low pressure (step 406=NO), so method 900 must determine whether the use in instruction 700 is the first low pressure mention in the basic block or whether this is the first low pressure mention after a high pressure region within the same basic block (step 940). There is another low pressure mention (i.e., instruction 702) in block G. In addition, this same instruction 702 is the first low pressure mention after a high pressure region in block G, so instruction 700 is not the first low pressure mention after the high pressure region in block G. Thus, the answer to step 940 is NO, and no load is inserted for instruction 700. Next, instruction 702 is analyzed. This is a use of spill candidate X (step 404=YES), the use is in low pressure (step 406=NO), and this use is the first low pressure mention in this basic block, so the answer to step 940 is YES and a load (instruction 1000) is inserted (step 410) before the use in instruction 702.

Instruction 704 is analyzed next. This instruction has a use of spill candidate X (step 404=YES) in high pressure (step 406=YES). Following the spill everywhere default, a load is needed (step 408), so a load (instruction 1002) is inserted (step 410) before the use in instruction 704. Instruction 706 is analyzed next. This instruction has a use of X (step 404=YES) in low pressure (step 406=NO), and the use is the first low pressure mention of X in block F (step 940=YES). As a result, a load (instruction 1004) is inserted (step 410) before the use in instruction 706. The next step is to analyze instruction 708. This instruction has a use of X (step 404=YES) in low pressure (step 406=NO), but is not the first low pressure mention since instruction 710 has a use of X immediately preceding instruction 708, nor is it the first low pressure mention following a high pressure region within block B. As a result, the answer to 940 is NO, and no load is inserted for instruction 708. Instruction 710, on the other hand, has a use (step 404=YES) in low pressure (step 406=NO) , and is the first low pressure mention in block B (step 940=YES), so a load (instruction 1010) is inserted (step 410) prior to the use in instruction 710. Next instruction 712 is analyzed. This is not a use of spill candidate X (step 404=NO), but is a def (step 920=YES). First method 900 determines whether the def in instruction 712 reaches a use in the same basic block that has a load before the use. There are no uses of X in basic block A, so the answer to step 922 is NO. Method 900 next determines (step 924) whether the def in instruction 712 reaches the exit of block A. Since there is a definition of X in block A (i.e., instruction 712) that reaches an inserted load (e.g., instruction 1010 in block B), the answer to step 924 is YES, and a store (instruction 1006) is inserted (step 430) after the def in instruction 712.

Next, instruction 714 is analyzed. This is not a use of spill candidate X (step 404=NO), but is a def (step 920=YES).

Figure 11:
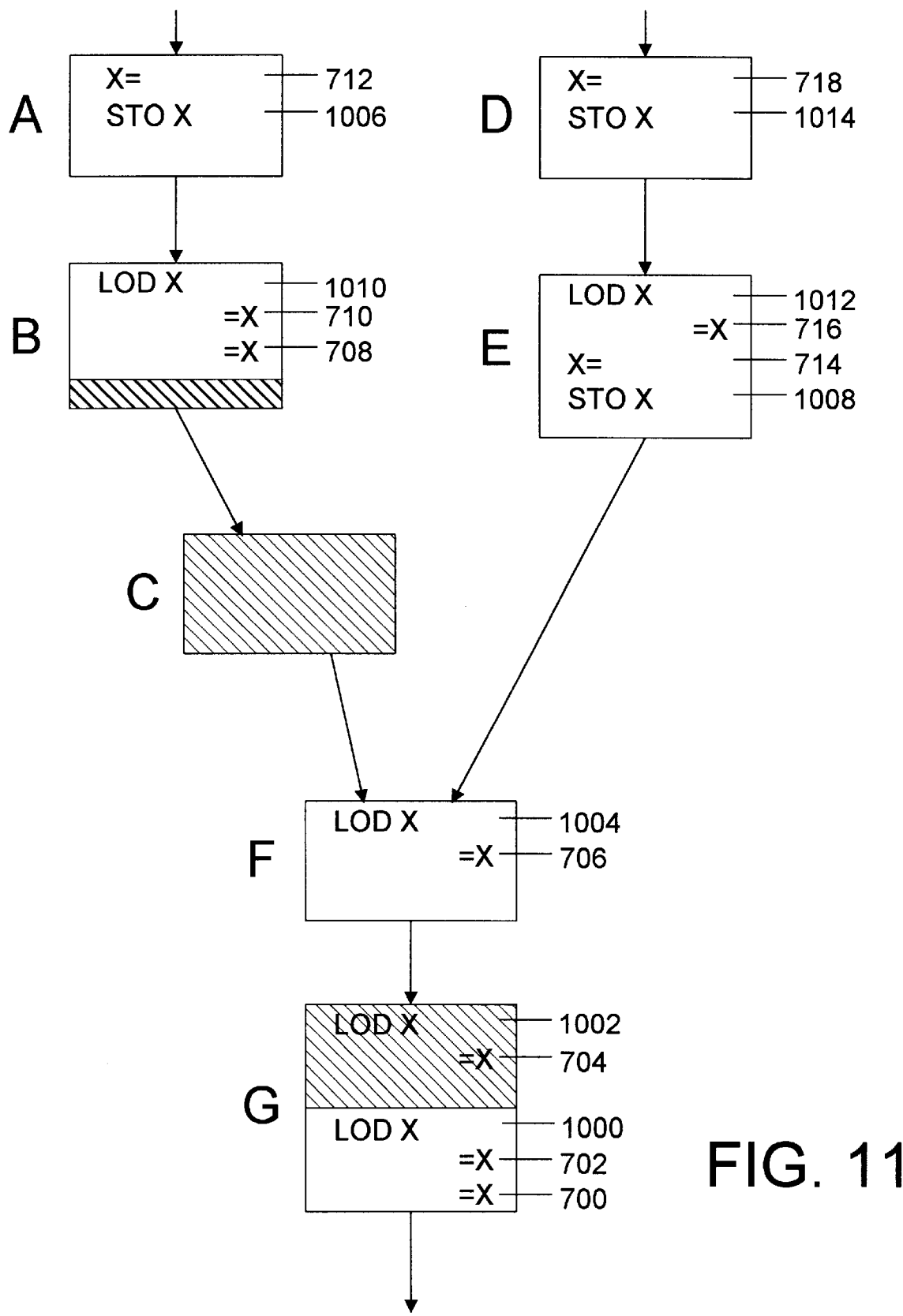
FIG. 11 is a program flow diagram that results from performing the spill code insertion method of FIG. 10 on the flow diagram of FIG. 8.

Since in block E there is no use of X that follows instruction 714 the answer to step 922 is NO. The definition of X in block E (instruction 714) that reaches an inserted load instruction (e.g., instruction 1004 in block F), the answer to step 924 is YES, and a store (instruction 1008) is inserted (step 430) after the def in instruction 714. The next instruction to be analyzed is instruction 716. This is a use of spill candidate X (step 404=YES) in low pressure (step 406=NO), and the use is the first low pressure mention in block E (step 940=YES), so a load (instruction 1012) is inserted (step 410) before the use in instruction 716. The last instruction to be analyzed is instruction 718. This is not a use of spill candidate X (step 404=NO) but is a def (step 920=YES). This def has no use in block D (step 922=NO). This def, however, is live on exit of block D. As a result, the answer to step 924 is YES, and a store (instruction 1014) is inserted (step 430) after the def in instruction 718. The resultant instruction stream from applying method 900 of FIG. 10 to instruction stream 750 of FIG. 8 is shown in FIG. 11.

Step 940 as shown in FIG. 10 is a compromise step that balances the efficiency of the instruction stream against the time required to generate the spill code. If processing time were not a factor, it would be more precise to determine whether the use is the first mention of the register after a high pressure region, whether the high pressure region was in the same basic block or in a preceding block. However, making this determination across multiple basic blocks may require intensive compile time, so a compromise was selected to speed the generation of spill code by making spill decisions for each basic block independent of other basic blocks. This compromise allows spill code to be inserted during a single pass through the instruction stream, thereby improving compile time. For step 940 of the method 900 shown in FIG. 10, a load is inserted if the use is the first low pressure mention of the register in the block, or if the use is the first low pressure mention of the register after a high pressure region in the same basic block. In this manner a load is always inserted once before a use in a low pressure region of the block if the use is the first use in the block or the first use after a high pressure region in the block. A different but equally viable compromise would never insert a load before the first low pressure use. The risk of the latter approach is that the register may remain alive at the end of a high pressure region. Either of these approaches shorten processing time by requiring less information in making the spill decision. Of course, the spill decisions that result are not as precise as for the more general method 400 of FIG. 4, but the reduction in precision is a trade-off for a shorter compile time.

Figure 12:
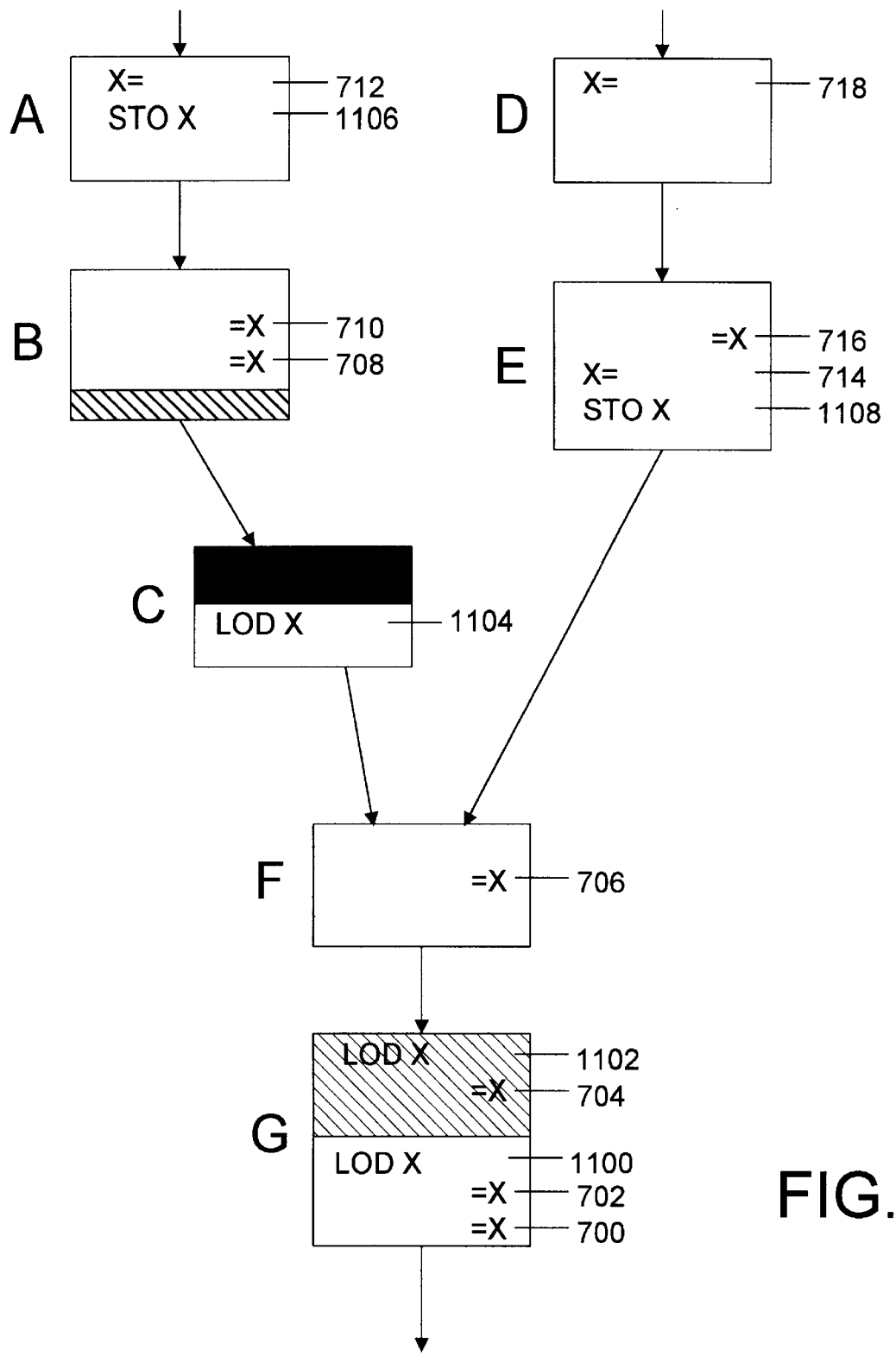
FIG. 12 is a program flow diagram that results from performing the spill code insertion method in accordance with a third embodiment of the present invention on the flow diagram of FIG. 8.

At the expense of additional compile time, further refinements to method 400 may be made to assure that spill code will be placed in a manner such that there would never be a load within a low pressure region except at a boundary with a high pressure region. By placing the loads at exit points from certain high pressure regions that reach low pressure uses, partially redundant loads are eliminated. This type of an arrangement is shown by the flow diagram of FIG. 12 in accordance with a third embodiment of the present invention. An example of a partially redundant load is the load instruction 1004 of FIG. 11. While this load instruction is needed for the branch with blocks A, B and C, it is not needed for the branch with blocks D and E, making it partially redundant. By placing the load instruction 1104 at the end of the high pressure region in block C as shown in FIG. 12, this partial redundancy is eliminated. Similarly, fully redundant loads and stores may be eliminated, producing the program flow diagram of FIG. 12. As a result, the run-time performance of the code is enhanced, but at the expense of an increased compile time. While the specific method for arriving at the spill code placement of FIG. 12 is not disclosed herein, those skilled in the art will understand that additional global dataflow techniques will be required to eliminate partial redundancies by generating the spill code in the appropriate locations as shown in FIG. 12.

The apparatus and method in accordance with the present invention greatly reduces the amount of spill code generated by the Chaitin/Briggs spill everywhere approach, which enhances the performance of the resultant instruction stream. By taking register pressure into account when making spill decisions, spill code is minimized in low pressure regions, which improves the run-time performance of the resultant instruction stream.

It is important to note that while the present invention has been described in the context of a fully functional computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communication links.

While the invention has been particularly shown and described with reference to preferred exemplary embodiments thereof, it will be understood by those skilled in the art that various changes in form and details may be made therein without departing from the spirit and scope of the invention. For example, while the discussion herein refers to symbolic registers in an intermediate language instruction stream to illustrate the concepts of the present invention, the present invention also extends to other implementations involving other types of instruction streams and program variables.

We claim:

1. A computer apparatus comprising:
   (A) a processor having a plurality of registers, the processor executing a first instruction stream and in response to the first instruction stream, the processor operates on information stored in the plurality of registers;
   (B) a compiler for generating the first instruction stream from a second instruction stream, the second instruction stream having a plurality of variables, the compiler including:
   a spill code generator, the spill code generator including:
      a register pressure indicator, the register pressure indicator indicating the register pressure at a plurality of regions within the second instruction stream;
      a load instruction inserter;
      a store instruction inserter;
      the load instruction inserter inserting at least one memory load instruction into the second instruction stream and the store instruction inserter inserting at least one memory store instruction into the second instruction stream at locations that reduce register pressure in at least one of the plurality of regions where the register pressure indicator indicates that the register pressure exceeds a first predetermined threshold level;
      the load instruction inserter and the store instruction inserter avoiding the insertion of memory load instructions and memory store instructions at locations that reduce register pressure in at least one of the plurality of regions where the register pressure indicator indicates that the register pressure is less than the first predetermined threshold level; wherein the load instruction inserter and the store instruction inserter avoid the insertion of memory load instructions and memory store instructions at locations that reduce register pressure only in at least one of the plurality of regions where the register pressure indicator indicates that the register pressure is less than a second predetermined threshold level.

2. The computer apparatus of claim 1 wherein the first predetermined threshold level equals the second predetermined threshold level.

3. The computer apparatus of claim 1 wherein the first predetermined threshold level equals the number of the plurality of registers, and wherein the second predetermined threshold level equals the number of the plurality of registers.

4. A computer apparatus for generating a first instruction stream from a second instruction stream, the first instruction stream being executable on a processor having a plurality of registers, the second instruction stream having a plurality of variables, the computer apparatus comprising:

a spill code generator, the spill code generator including:
  a register pressure indicator, the register pressure indicator indicating the register pressure at a plurality of regions within the second instruction stream;
  a load instruction inserter;
  a store instruction inserter;
  the load instruction inserter inserting at least one memory load instruction into the second instruction stream and the store instruction inserter inserting at least one memory store instruction into the second instruction stream at locations that reduce register pressure in at least one of the plurality of regions where the register pressure indicator indicates that the register pressure exceeds a first predetermined threshold level;
  the load instruction inserter and the store instruction inserter avoiding the insertion of memory load instructions and memory store instructions at locations that reduce register pressure in at least one of the plurality of regions where the register pressure indicator indicates that the register pressure is less than the first predetermined threshold level;
  wherein the load instruction inserter and the store instruction inserter avoid the insertion of any memory load instructions and memory store instructions at locations that reduce register pressure only in at least one of the plurality of regions where the register pressure indicator indicates that the register pressure is less than a second predetermined threshold level.

5. The computer apparatus of claim 4 wherein the first predetermined threshold level equals the second predetermined threshold level.

6. The computer apparatus of claim 4 wherein the first predetermined threshold level equals the number of the plurality of registers, and wherein the second predetermined threshold level equals the number of the plurality of registers.

7. A method for generating spill code in an optimizing compiler, the compiler generating a first instruction stream from a second instruction stream, the method comprising the steps of:

computing register pressure at a plurality of regions within the second instruction stream;

inserting at least one memory load instruction in the second instruction stream;

inserting at least one memory store instruction in the second instruction stream;

the locations of the inserted memory load instructions and memory store instructions are selected to reduce register pressure in at least one of a plurality of regions where the register pressure exceeds a first predetermined threshold level and to not reduce register pressure in at least one of the plurality of regions where the register pressure is less than the first predetermined threshold level, wherein the locations of the inserted memory load instructions and memory store instructions are selected to avoid reducing register pressure only in at least one of the plurality of regions where the register pressure is less than a second predetermined threshold level.

* * * * *

UNITED STATES PATENT AND TRADEMARK OFFICE
CERTIFICATE OF CORRECTION

PATENT NO. : 5,946,491
DATED : Aug. 31, 1999
INVENTOR(S) : Nava Arela Aizikowitz, Liviu Asnash, Roy Bar-Haim, Edward Curtis Prosser, Robert Ralph Roediger and William Jon Schmidt It is certified that error appears in the above-identified patent and that said Letters Patent is hereby corrected as shown below:

In the Title [54], Line 2, "GERNERATING" should be --GENERATING--.

Signed and Sealed this

Twenty-fifth Day of January, 2000

Attest:

Attesting Officer

*Acting Commissioner of Patents and Trademarks*